United States Patent
Tezuka et al.

(10) Patent No.: US 9,546,858 B2
(45) Date of Patent: Jan. 17, 2017

(54) TRAJECTORY DISPLAY DEVICE FOR DISPLAYING TRAJECTORIES OF MOTOR END AND MACHINE END

(71) Applicant: FANUC CORPORATION, Yamanashi (JP)

(72) Inventors: Junichi Tezuka, Yamanashi (JP); Hajime Ogawa, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 0 days.

(21) Appl. No.: 14/841,848

(22) Filed: Sep. 1, 2015

(65) Prior Publication Data

US 2016/0069659 A1    Mar. 10, 2016

(30) Foreign Application Priority Data

Sep. 9, 2014 (JP) .................... 2014-183643

(51) Int. Cl.
  *G01B 5/008* (2006.01)
  *G01B 5/004* (2006.01)
  *B23Q 1/00* (2006.01)

(52) U.S. Cl.
  CPC .............. *G01B 5/008* (2013.01); *G01B 5/004* (2013.01); *B23Q 1/0045* (2013.01)

(58) Field of Classification Search
  CPC .......... G01B 5/004; G01B 5/008; G05B 19/18
  (Continued)

(56) References Cited

U.S. PATENT DOCUMENTS

| 6,519,860 B1* | 2/2003 | Bieg | G01B 5/008 33/1 PT |
| 8,988,032 B2* | 3/2015 | Iwashita | G05B 19/4068 318/568.25 |

(Continued)

FOREIGN PATENT DOCUMENTS

| JP | 659717 A | 3/1994 |
| JP | 2006227886 A | 8/2006 |

(Continued)

OTHER PUBLICATIONS

English Abstract for Japanese Publication No. 2011-170584 A, published Sep. 1, 2011, 1 pg.

(Continued)

*Primary Examiner* — Christopher Fulton
(74) *Attorney, Agent, or Firm* — Fredrikson & Byron, P.A.

(57) ABSTRACT

A trajectory display device, by which an operator can visually and easily compare actual trajectories of a motor end and a machine end, and can easily determine a reason for deviation between the trajectories. The device has a motor-side position obtaining part which obtains positional information of a motor at predetermined sampling periods of time; a motor end actual coordinate calculating part which calculates an actual coordinate value of the motor end based on mechanical information and the positional information of the motor; a machine end data obtaining part which obtains point sequence data on an actual trajectory of the machine end; and a displaying part which displays and overlaps the actual coordinate of the motor end and the point sequence data of the machine end, as actual trajectories of the motor end and the machine end, so that central coordinates of the trajectories coincide with each other.

1 Claim, 5 Drawing Sheets

(58) Field of Classification Search
USPC .......................................................... 33/503
See application file for complete search history.

(56) References Cited

U.S. PATENT DOCUMENTS

| | | | | |
|---|---|---|---|---|
| 9,097,504 | B2 * | 8/2015 | Ishikawa | G01B 5/008 |
| 9,144,869 | B2 * | 9/2015 | Sato | B23Q 5/28 |
| 2011/0202167 | A1 | 8/2011 | Iwashita et al. | |
| 2013/0096700 | A1 * | 4/2013 | Tezuka | G05B 19/408 |
| | | | | 700/83 |
| 2013/0325166 | A1 | 12/2013 | Tezuka et al. | |
| 2016/0209825 | A1 * | 7/2016 | Murakawa | G05B 19/19 |

FOREIGN PATENT DOCUMENTS

| | | |
|---|---|---|
| JP | 2011170584 A | 9/2011 |
| JP | 2013069231 A | 4/2013 |
| JP | 2013257809 A | 12/2013 |

OTHER PUBLICATIONS

Translated Decision to Grant a Patent for Japanese Application No. 2014-183643, Date of Mailing: Feb. 9, 2016, 3 pages.
Untranslated Decision to Grant a Patent for Japanese Application No. 2014-183643, Date of Mailing: Feb. 9, 2016, 3 pages.
Translated Notification of Reasons for Refusal for Japanese Application No. 2014-183643, Date of Mailing: Dec. 1, 2015, 3 pages.
Untranslated Notification of Reasons for Refusal for Japanese Application No. 2014-183643, Date of Mailing: Dec. 1, 2015, 3 pages.
English translation of Japanese Publication No. 2013257809, published Dec. 26, 2013, 15 pages.
English translation of Japanese Publication No. 2013069231, published Apr. 18, 2013, 9 pages.
English translation of Japanese Publication No. 2006227886, published Aug. 31, 2006, 11 pages.
English Abstract and Machine Translation for Japanese Publication No. 06-059717, published Mar. 4, 1994, 12 pgs.

* cited by examiner

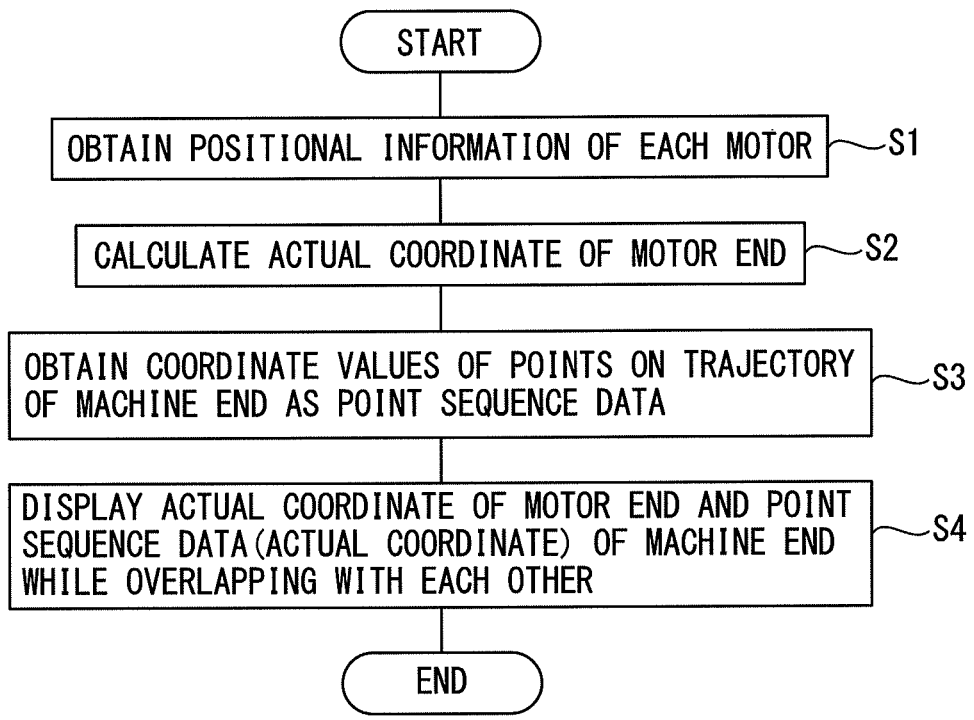
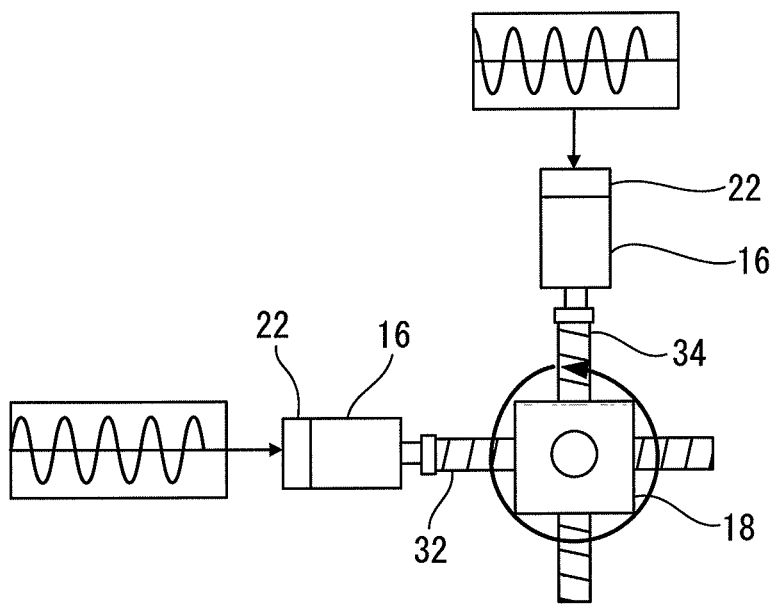

TRAJECTORY DISPLAY DEVICE FOR DISPLAYING TRAJECTORIES OF MOTOR END AND MACHINE END

BACKGROUND OF THE INVENTION

1. Field of the Invention

The present invention relates to a trajectory displaying device having a function for displaying trajectories of a motor end and a machine end.

2. Description of the Related Art

In the prior art, as a method for monitoring an error in a shape of a machined object, a tool trajectory displaying method has been used, wherein a commanded trajectory of a representative point (such as a tool center point) of a machine tool and a feedback trajectory obtained when the representative point is actually moved according to the command are overlapped and displayed so that an error of the feedback trajectory relative to the commanded trajectory is visually monitored.

For example, JP H06-059717 A discloses an NC device having a function for overlapping a movement trajectory of a tool generated by analyzing an NC program with positional data obtained when the tool is moved according to the movement trajectory.

In the prior art, when an actual trajectory of a machine end measured by a measuring instrument configured to measure a trajectory of the machine end is compared to an actual trajectory of a motor end calculated from positional data of the motor end, the respective actual trajectories are displayed on separate indicators, etc. In this regard, when the actual trajectory of the machine end is fluctuated (or deviated from a command trajectory), such fluctuation may be due to either of two factors, i.e., a fluctuation of the position (trajectory) of the motor end, or, a fluctuation (or a mechanical error) of a mechanism for transmitting the motion of the motor end to the machine end. Therefore, it is difficult to discriminate one factor from another, merely by monitoring trajectory data of the machine end. Further, when the actual trajectories of the machine end and the motor end are separately displayed, it is difficult to compare and analyze the trajectories.

In the technique disclosed in JP H06-059717 A, a movement trajectory of a tool generated by an NC program and an actual trajectory of the tool obtained when the tool is moved based on the movement trajectory are displayed while being overlapped with each other. In other words, the NC device in JP H06-059717 A has a function for overlapping the feedback trajectory with the command trajectory, but is not configured to overlap two different types of actual trajectories with each other.

SUMMARY OF THE INVENTION

An object of the present invention is to provide a trajectory display device, by which an operator can visually and easily compare actual trajectories of the motor end and the machine end, and can easily determine a reason for deviation between the trajectories.

According to the present invention, a trajectory display device for displaying a trajectory of a movable part which is moved along a circle or an arc based on a motion program, the trajectory display device comprising: a motor-side position obtaining part which obtains positional information of a motor for driving the movable part, from a motor-side detector arranged on the motor at predetermined sampling periods of time; a motor end actual coordinate calculating part which calculates an actual coordinate value of a motor end of the motor based on mechanical information and the positional information of the motor; a position measuring instrument which measures a position of the movable part and outputs the position of the movable part as a coordinate value of a point on an actual trajectory of a machine end at predetermined time intervals; a machine end data obtaining part which obtains the coordinate values of the points on the actual trajectory of the machine end as point sequence data; and a displaying part which displays the actual coordinate of the motor end and the point sequence data of the machine end, as the actual trajectory of the motor end and the actual trajectory of the machine end, respectively, wherein the actual trajectories of the motor end and the machine end are overlapped with each other so that a central coordinate of a circle or an arc constituted by the actual trajectory of the motor end coincides with a central coordinate of a circle or an arc constituted by the actual trajectory of the machine end, is provided.

In a preferred embodiment, the central coordinate of the circle or the arc constituted by the actual trajectory of the motor end corresponds to a program origin of the motion program.

In a preferred embodiment, the trajectory display device further comprises a central coordinate calculating part which calculates the central coordinate of the circle or the arc constituted by the actual trajectory of the motor end, based on the actual coordinates of the motor end.

In this case, the central coordinate calculating part may calculate the central coordinate of the circle or the arc constituted by the actual trajectory of the motor end, based on the actual coordinates of the motor end which are not included in a predetermined angular range including a quadrant projection.

BRIEF DESCRIPTION OF THE DRAWINGS

The above and other objects, features and advantages of the present invention will be made more apparent by the following description of the preferred embodiments thereof with reference to the accompanying drawings wherein:

FIG. 2 is a flowchart showing an example of the procedure of the trajectory display device of FIG. 1;

FIG. 3 is a schematic view showing an example of a mechanism for moving a movable part of the machine tool;

DETAILED DESCRIPTION

Figure 1:
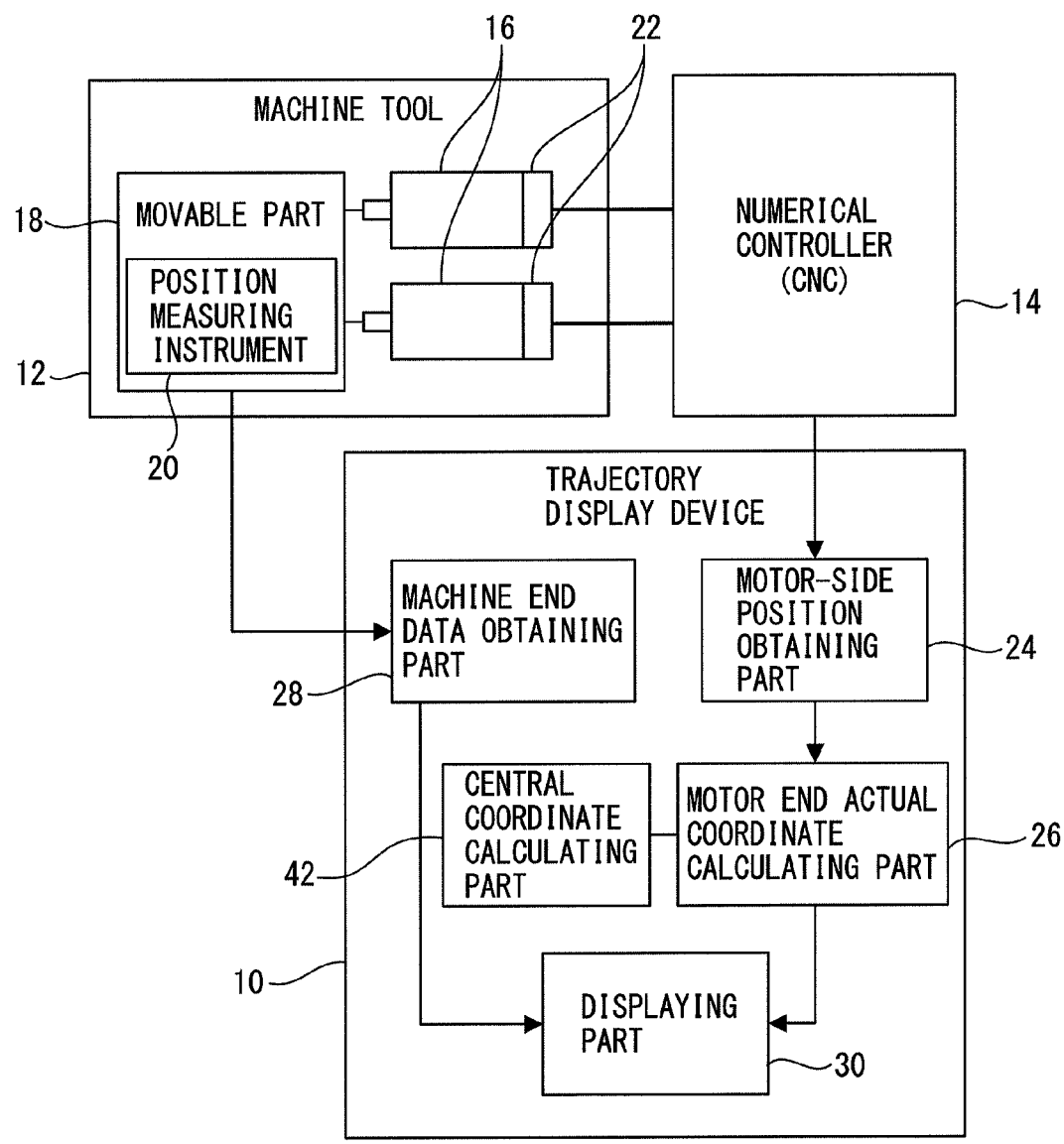
FIG. 1 is a functional block diagram showing a trajectory display device according to a preferred embodiment of the present invention, along with a machine tool including an object to be displayed by the trajectory display device, and a numerical controller for controlling the machine tool.

FIG. 1 is a functional block diagram showing a trajectory display device 10 according to a preferred embodiment of the present invention, along with a machine tool 12 including an object to be displayed by the trajectory display device, and a numerical controller (CNC) 14 for controlling machine tool 12. Machine tool (or a mechanical unit) 12 has at least one, preferably two or more (two in the illustrated embodiment) motor 16 such as a servomotor, and a movable part 18 (for example, an X-Y table as described below) which is moved along a circle or an arc by motors 16. The position of movable part 18 (or a machine end) can be measured by a position measuring instrument 20 such as a ball bar, a cross-grid encoder or a photosensor, etc.

A motor-side detector 22, such as an encoder or a resolver, is attached to each motor 16, whereby numerical controller 14 can obtain positional information of each motor 16. Numerical controller 14 carries out control (for example, feedback control) of each motor 16 based on a predetermined processing program and obtained positional information of each motor, so that movable part 18 is moved along a circle or an arc.

Trajectory display device 10 has a motor-side position obtaining part 24 which obtains positional information of motor 16 from motor-side detector 22, at predetermined sampling periods of time; a motor end actual coordinate calculating part 26 which calculates an actual coordinate value of a motor end of the motor based on mechanical information and the positional information of motor 16; a machine end data obtaining part 28 which obtains coordinate values of points, as point sequence data, on an actual trajectory of a machine end with respect to movable part 18, from position measuring instrument; and a displaying part 30 which displays the actual coordinate of the motor end and the point sequence data of the machine end, as the actual trajectory of the motor end and the actual trajectory of the machine end, respectively, wherein the actual trajectories of the motor end and the machine end are overlapped with each other so that a central coordinate of a circle or an arc constituted by the actual trajectory of the motor end coincides with a central coordinate of a circle or an arc constituted by the actual trajectory of the machine end. Although trajectory display device 10 is illustrated as a device separated from numerical controller 14 in the embodiment of FIG. 1, trajectory display device 10 may be integrally formed with numerical controller 14 so that numerical controller has a function of trajectory display device 10.

Next, an example of the procedure in trajectory display device 10 will be explained, with reference to a flowchart of FIG. 2. In this example, as shown in FIG. 3, movable part (or table) 18 of machine tool 12 is moved along a circle, by two drive axes (X-axis 32 and Y-axis 34) which are orthogonal to each other and respectively connected to two motors 16, based on a predetermined motion program such as a processing program. When sine-wave commands having phases different from each other by 90 degrees are respectively transmitted to two motors 16, table 18 is moved along a circle in accordance with to the commands.

First, in step S1, motor-side position obtaining part 24 obtains positional information of each motor 16 at predetermined sampling periods of time. Concretely, motor-side position obtaining part 24 obtains sine-wave positional information of each motor 16, from motor-side detector 22 attached to each motor. Otherwise, when numerical controller 14 controls each motor 16 by feedback control, positional information of each motor may be obtained as time series data from numerical controller 14.

Next, in step S2, motor end actual coordinate calculating part 26 calculates the actual coordinate $(X_k(k \cdot \Delta t), Y_k(k \cdot \Delta t))$ of the motor end, based on mechanical information (the shape and dimension of a drive axis) and obtained positional information $(x_k(k \cdot \Delta t), x_k(k \cdot \Delta t))$ of the motors for driving X-axis 32 and Y-axis 34, wherein "$\Delta t$" is a sampling period of time and "k"=1, 2, . . . , N. In this regard, the "motor end" means the position of the motor calculated from positional information (such as the rotational position) of the motor obtained by the motor-side detector and from mechanical information such as the shape and dimension of a driver such as a feed axis directly connected to the motor. On the other hand, the "machine end" means the position of a representative point of the movable part (for example, the center of the table), which can be directly measured by the position detector, etc. Therefore, when there is no dimensional error or fluctuation in a mechanical unit between the motor end and the machine end, the actual trajectory of the motor end coincides with the actual trajectory of the machine end.

In the example of FIG. 3, the position of the motor end corresponds to a product of an integration value of feedback pulses obtained motor-side detector 22 and an amount of movement of the corresponding drive axis. For example, when the amount of movement of X-axis per one pulse corresponds to one micrometer, the integration value of 1000 pulses means that the motor end has been moved by one millimeter in the X-axis direction.

Figure 4:
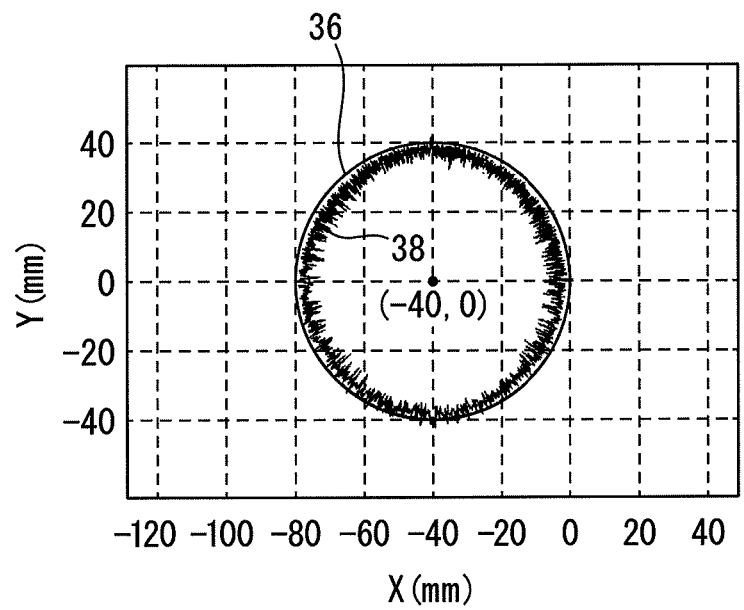
FIG. 4 is a graph showing an example of an actual trajectory of a motor end relative to a predetermined commanded trajectory.

By displaying the actual coordinates of the motor end obtained as such on the orthogonal coordinate system, the actual trajectory of the motor end can be displayed. For example, FIG. 4 indicates an actual trajectory 38 of the motor when the motor carries out the motion based on a motion command in which a circle, having a radius of 40 millimeters and centered at a coordinate (X,Y)=(−40, 0), is specified as a command trajectory 36.

Figure 5:
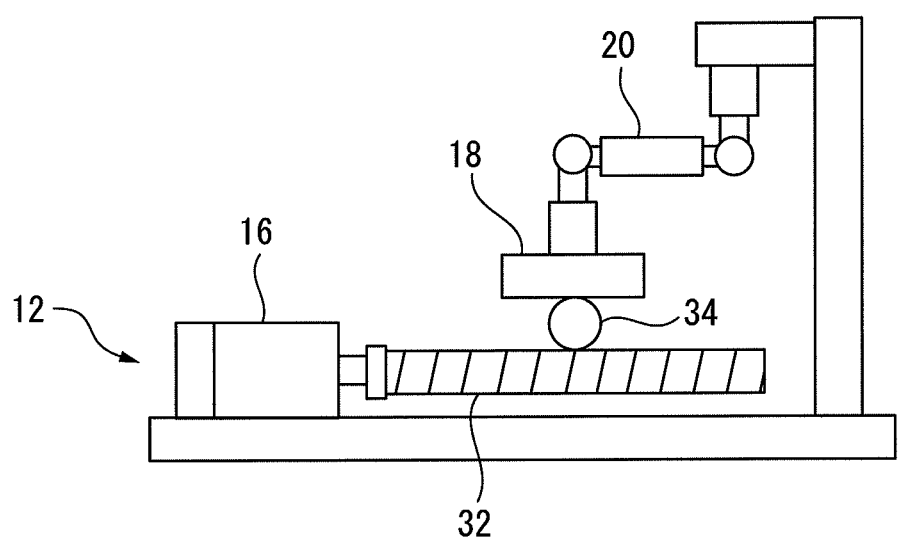
FIG. 5 is a schematic view showing an example of a position measuring instrument for measuring the position of the movable part.
Figure 6:
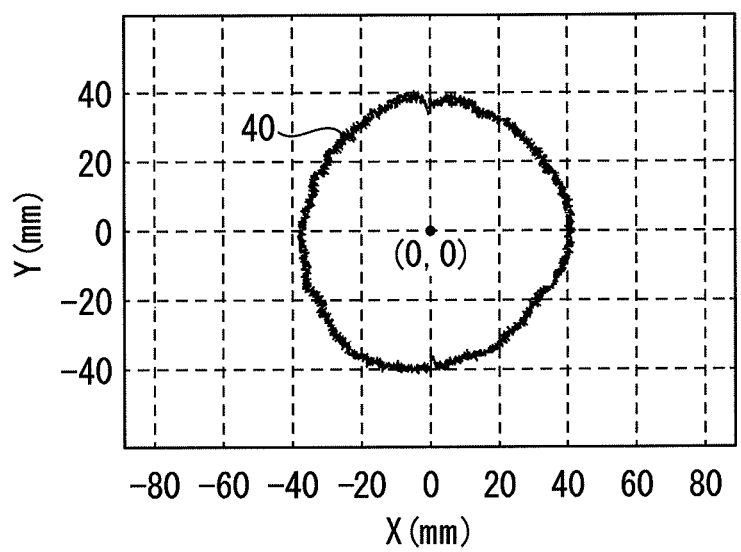
FIG. 6 is a graph showing an example of an actual trajectory of a machine end.

In the next step S3, as shown in FIG. 5, the position of the representative point of table 18 (for example, the table center) is measured at predetermined time intervals, by using position measuring instrument 20 (in the illustrated embodiment, a ball bar). Position measuring instrument 20 outputs the position of the representative point of table 18 as coordinate values $(X_k'(k \cdot \Delta t), Y_k'(k \cdot \Delta t))$ of points on the actual trajectory of the machine end, at predetermined time intervals. Then, machine end data obtaining part 28 obtains the output of position measuring instrument 20 as point sequence data. FIG. 6 indicates an actual trajectory 40 of the machine end, centered at a coordinate (X,Y)=(0, 0), which is obtained when the coordinate values $(X_k'(k \cdot \Delta t), Y_k'(k \cdot \Delta t))$ of the machine end are plotted on the X-Y coordinate system.

Next, in step S4, displaying pat 30 displays the actual trajectory of the motor end obtained in step S2 (see FIG. 4) and the actual trajectory of the machine end obtained in step S3 (see FIG. 6), so that these trajectories are overlapped with each other on the same coordinate system. In this regard, when the actual trajectory of FIG. 4 and the actual trajectory of FIG. 6 are simply overlapped and displayed, it may be difficult to compare the two trajectories to each other since the central coordinates thereof are different from each other. Therefore, as shown in FIG. 7, by displaying and overlapping the actual trajectories with each other so that a central coordinate of a circle or an arc constituted by actual trajectory 38 of the motor end coincides with a central coordinate of a circle or an arc constituted by actual trajectory 40 of the machine end, the two trajectories can be properly compared to each other.

Figure 7:
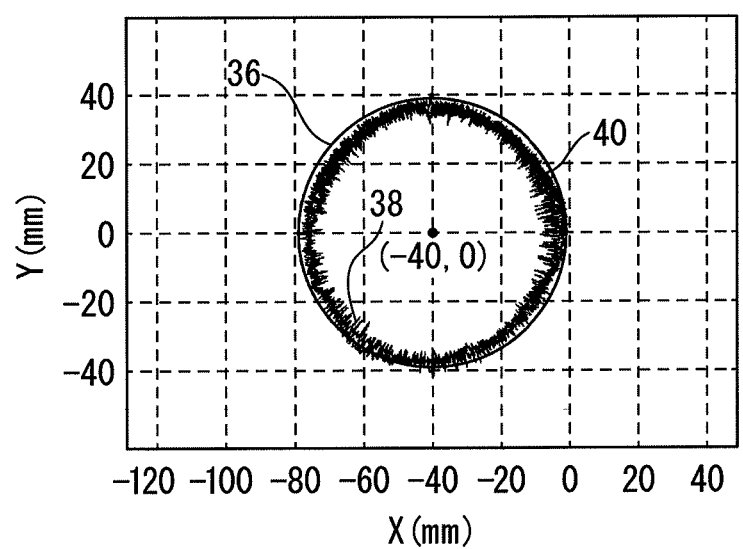
FIG. 7 is a graph showing an example of the actual trajectories of the motor end and the machine end relative to the predetermined commanded trajectory.

As a result of the procedure of step S4, as shown in FIG. 7, actual trajectory 38 of the motor end and actual trajectory 40 of the machine end are displayed in a contrastable manner. Therefore, when the actual trajectory of the machine end is fluctuated or significantly deviated from the commanded trajectory, it can be easily judged as to whether a major factor in the fluctuation or deviation is due to the motion of the motor end or due to the mechanical unit for transmitting the motion of the motor end to the machine end. In other words, when actual trajectory 38 of the motor end and actual trajectory 40 of the machine end substantially coincide with each other, the major factor in the fluctuation or deviation is due to the motion of the motor end. On the other hand, when actual trajectory 38 of the motor end and actual trajectory 40 of the machine end are considerably deviated from each other, the major factor in the fluctuation or deviation is due to the mechanical unit between the motor end and the machine end.

In addition, by displaying actual trajectory 38 of the motor end and actual trajectory 40 of the machine end while overlapping with each other so that the central coordinates thereof coincide with each other, an effect on the machine end due to adjustment of the trajectory of the motor end (such as servo adjustment of the motor) can be easily found by the operator.

In order that the central coordinates of the two trajectories coincide with each other, various methods may be used. For example, as shown in FIG. 7, a program origin of the above processing program is determined as the central coordinate (−40, 0) of the circle constituted by actual trajectory 38 of the motor end, and actual trajectory 40 of the machine end is translated so that the central coordinate (0, 0) of the circle constituted by actual trajectory 40 of the motor end, which is output by
Position measuring instrument 20, coincides with the program origin, whereby the central coordinates of the two trajectories coincide with each other.

Figure 8:
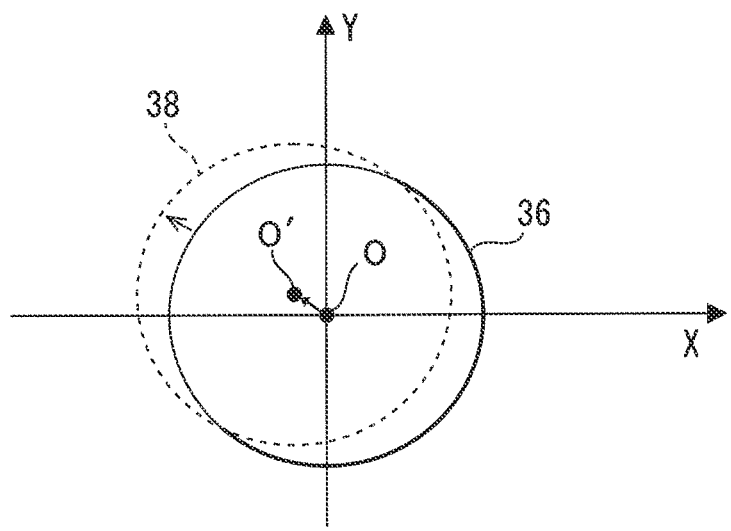
FIG. 8 is a diagram explaining the procedure for resolving a deviation of a central coordinate of the motor end.

As shown in FIG. 8, actual trajectory 38 of the motor end may be deviated from commanded trajectory 36, and in this case, program origin "O" and central coordinate "O'" of actual trajectory 38 do not coincide with each other. In such a case, a central coordinate calculating part 42 may be further provided to trajectory display device 10 (see FIG. 1), and central coordinate calculating part 42 may calculate the central coordinate of the circle based on the actual trajectory of the motor end. Concretely, as represented by following equation (1), a least-square method may be used so as to calculate a coordinate $(X_0, Y_0)$ in which an integrated value "S" of errors relative to a circle having a radius "r" is minimized. Since the coordinate $(X_0, Y_0)$ corresponds to central coordinate O' of actual trajectory 38, the deviation of the actual trajectory of the motor end relative to the commanded trajectory can be canceled by translating program origin O to central coordinate O'.

$$S = \sum_{k=1}^{n} \left( \sqrt{(X_k(k \cdot \Delta t) - X_0)^2 + (Y_k(k \cdot \Delta t) - y_0)^2} - r \right)^2 \quad (1)$$

Figure 9:
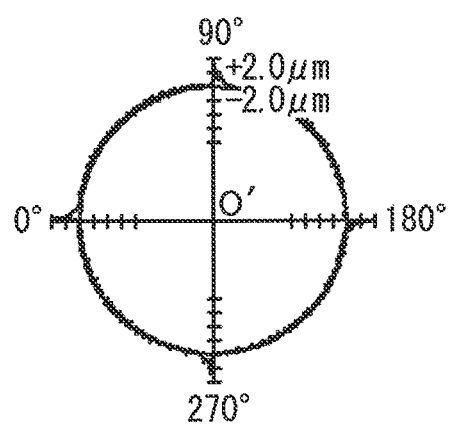
FIG. 9 is a diagram showing an example wherein the actual trajectory of the motor end includes a quadrant projection.

Further, as shown in FIG. 9, in case that a quadrant projection may be generated due to a backlash, etc., at the time of reversing of the drive axis, central coordinate O' of the motor end may not be precisely calculated. In such a case, it is preferable that central coordinate calculating part 42 as described above calculate central coordinate O' of actual trajectory 38 of the motor end, based on data of the actual coordinates of the motor end which are not included in a predetermined angular range including a quadrant projection. In the illustrated embodiment, the predetermined angular range is determined as four sets of data about 0, 90, 180 and 270 degrees, respectively (for example, each set has a range from 0 to 2-5 degrees, a range from 90 to 92-95 degrees, a range from 180 to 182-185 degrees, and a range from 270 to 272-275 degrees, respectively). By virtue of this, central coordinate O' can be precisely calculated.

According to the invention, the actual trajectory of the motor end and the actual trajectory of the machine end can be displayed in a contrastable manner, and thus the effect on the machine end due to adjustment of the trajectory of the motor end, and/or the factor in fluctuation of the actual trajectory of the machine end can be easily found by the operator.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A trajectory display device for displaying a trajectory of a movable part which is moved along a circle or an arc based on a motion program, the trajectory display device comprising:
    a motor-side position obtaining part which obtains positional information of a motor for driving the movable part, from a motor-side detector arranged on the motor at predetermined sampling periods of time;
    a motor end actual coordinate calculating part which calculates an actual coordinate value of a motor end of the motor based on mechanical information and the positional information of the motor;
    a position measuring instrument which measures a position of the movable part and outputs the position of the movable part as a coordinate value of a point on an actual trajectory of a machine end at predetermined time intervals;
    a machine end data obtaining part which obtains the coordinate values of the points on the actual trajectory of the machine end as point sequence data; and
    a displaying part which displays the actual coordinate of the motor end and the point sequence data of the machine end, as the actual trajectory of the motor end and the actual trajectory of the machine end, respectively, wherein the actual trajectories of the motor end and the machine end are overlapped with each other so that a central coordinate of a circle or an arc constituted by the actual trajectory of the motor end coincides with a central coordinate of a circle or an arc constituted by the actual trajectory of the machine end; and
    a central coordinate calculating part which calculates the central coordinate of the circle or the arc constituted by the actual trajectory of the motor end, based on the actual coordinates of the motor end,
    wherein the central coordinate calculating part calculates the central coordinate of the circle or the arc constituted by the actual trajectory of the motor end, based on the actual coordinates of the motor end which are not included in a predetermined angular range including a quadrant projection.

* * * * *